Figure 1:
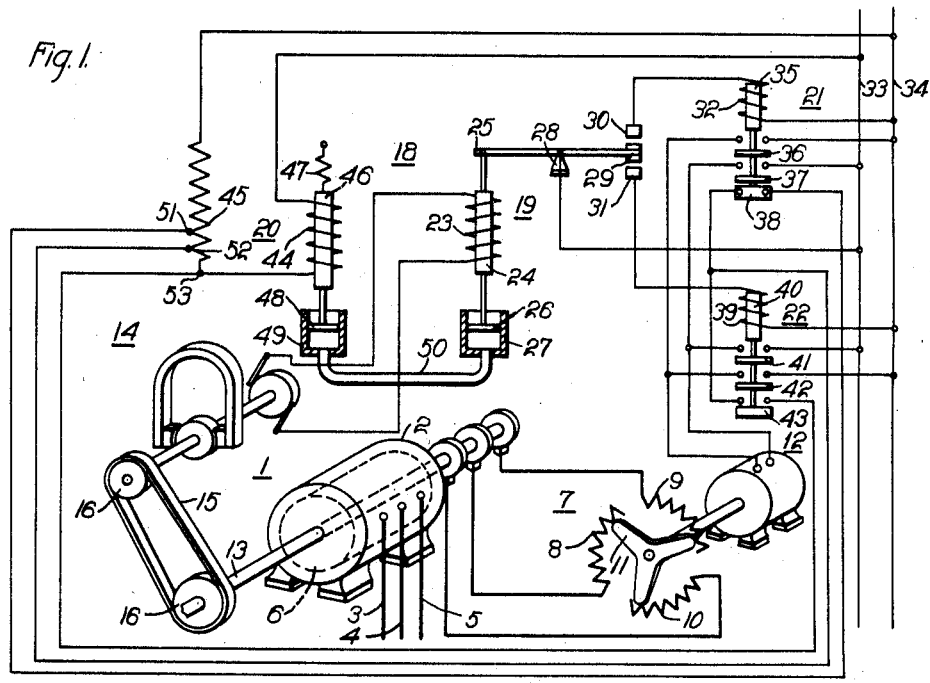

Oct. 14, 1924.

C. A. BODDIE 1,511,393

SPEED REGULATOR SYSTEM

Filed Aug. 26, 1919

WITNESSES:
H. B. Funk.
W. B. Wells.

INVENTOR
Clarence A. Boddie
BY
Chesley G. Carr
ATTORNEY

Patented Oct. 14, 1924.

1,511,393

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed August 26, 1919. Serial No. 319,906.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems, and particularly to regulator systems for governing the speed of induction motors.

One object of my invention is to provide a regulator system that shall maintain the speed of an induction motor substantially constant in an efficient and effective manner and that shall be provided with means for preventing so-called hunting action.

In many industrial establishments, it is very desirable to operate various machines at a constant speed by means of motors which are connected to an alternating-current source of supply. In case induction motors are utilized for such purpose, considerable trouble is experienced, inasmuch as the speed of an induction motor varies in accordance with the supply-circuit voltage and in accordance with the load which is placed upon the motor.

Heretofore, when a number of induction motors have been connected to an alternating-current supply circuit, it has been customary to vary, by a suitable hand-control device, the resistance that is included in the circuit of the rotary field winding of the motor that is to be operated at a constant speed. Such hand control has proved very unsatisfactory and inappropriate for many classes of service.

In a regulator system constructed in accordance with my invention, an induction motor of the wound-rotor type, which is connected to a variable source of power and is adapted to perform any suitable work, is governed by an automatic regulator to maintain the speed of the motor substantially constant, irrespective of the variations of the supply circuit voltage and of the load which is placed upon the motor. The regulator preferably embodies a main control magnet which is energized in accordance with the speed of the induction motor to be regulated. The magnet is energized by any suitable means, such as a magneto or a generator, which is connected to the induction motor in any suitable manner. The main control magnet governs the operation of an auxiliary motor in a forward and in a reverse direction to vary the resistance included in the circuit of the rotor winding to maintain the speed of the induction motor substantially constant. Furthermore, the main control magnet operates auxiliary means to so change its setting as to prevent so-called hunting action on the part of the regulator.

Figure 2:
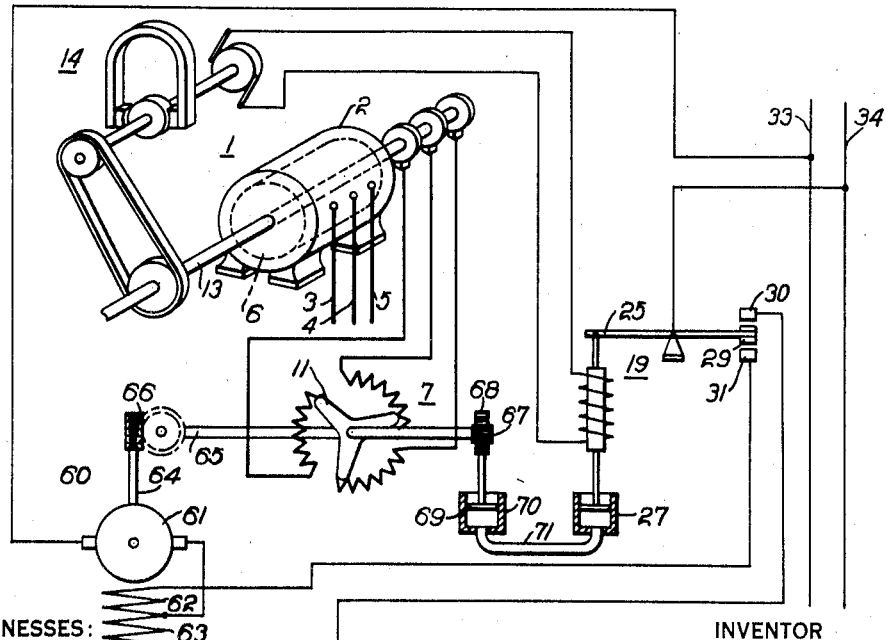

In the accompanying drawing, Figure 1 is a diagrammatic view of a regulator system constructed in accordance with my invention, and Fig. 2 is a diagrammatic view of a modification of my invention.

Referring to the drawing, an induction motor 1 comprises a stator winding 2 which is connected to a three-phase supply circuit comprising conductors 3, 4 and 5 and a rotor winding 6 which is connected to a rheostat 7. The rheostat 7 embodies three resistors 8, 9, and 10 which are connected to the slip rings of the motor and a plurality of arms 11 which are associated with the resistors 8, 9 and 10 and which are rotated in a clockwise and in a counter-clockwise direction by means of any suitable motor 12. The shaft 13 of the induction motor 1 is connected to a magneto or other suitable generator 14 by means of a flexible connector 15 and pulleys 16. However, it is to be understood that any other suitable means may be provided for operating the generator 14 in accordance with the speed of the induction motor.

A main control element 18, comprising a main magnet 19 and an auxiliary magnet 20 is provided for governing the operation of two switches 21 and 22 which, in turn, control the operation of the auxiliary motor 12. The main magnet 19 comprises a winding 23 which is directly connected to the generator 14 in order to be energized in accordance with the speed of the induction motor 1. A core armature 24, which is operated by the winding 23, is directly connected to a contact arm 25 and is provided with a piston 26 which operates within a cylinder 27. The contact arm 25 is fulcrumed at 28 and carries a main contact member 29 which is adapted to engage contact members 30 and 31 according to the operative position of the main magnet 19.

The switch 21 comprises a winding 32 which is connected across an auxiliary supply circuit comprising conductors 33 and 34 upon engagement between the contact members 29 and 30. The winding 32 operates a core armature 35 whcih controls two switch members 36 and 37 and an interlock switch member 38. The switch members 36 and 37 connect the motor 12 across the supply conductors 33 and 34 for operating the motor in a counter-clockwise direction to decrease the resistance in the rotor circuit and, consequently, to increase the induction-motor speed. The switch 22 comprises a winding 39 which is connected across the supply conductors 33 and 34 upon engagement between the contact members 29 and 31. A core armature 40 is controlled by the winding 39 for operating two switch members 41 and 42 and an interlock-switch member 43. The switch members 41 and 42 connect the motor 12 across the supply conductors 33 and 34 for operating it in a clockwise direction to increase the resistance in the rotor winding and to decrease the motor speed. The interlock switch members 38 and 43, which are associated with the switches 21 and 22 respectively, serve to prevent any hunting action by the main control element 18, as will be hereinafter set forth.

The auxiliary magnet 20 comprises a winding 44 which is connected, in series with a resistor 45, across the supply conductors 33 and 34. A core armature 46, which is controlled by the winding 44, is supported by means of a spring member 47 and is provided with a piston 48 which operates within a cylinder 49. The cylinders 27 and 49, which are associated with the main and the auxiliary magnets respectively, are connected by means of a pipe 50 containing any suitable fluid, preferably oil, in order to effect operation of the main magnet 19 in accordance with the operation of the auxiliary magnet 20. By such means, the setting of the main magnet is changed by the auxiliary magnet in order to prevent hunting action. By having a fluid connection between the electromagnets, the setting of the main electromagnet is changed only upon sudden movements of the auxiliary electromagnet. The system is so designed that the auxiliary electromagnet gives this sudden movement and subsequently resumes its original position so that the resetting of the main electromagnet to prevent hunting action is merely temporary. The two electromagnets have no definite relative positions constantly maintained.

The resistor 45 is provided with three taps 51, 52 and 53 which are connected to the interlock switch members 38 and 43. Upon operation of the switch 21, the interlock switch 38 opens a short circuit which normally obtains across that portion of the resistor 45 which is included between the taps 51 and 52 and, upon operation of the switch 22, the interlock switch member 43 short-circuits that portion of the resistor 45 which is included between the taps 52 and 53.

In case the speed of the induction motor 1 falls below normal value, the voltage of the generator 14 is reduced to lower the energization of the main magnet 19. Thereupon, the contact arm 25 is operated to effect engagement between the contact members 29 and 30. Upon engagement between the contact members 29 and 30, the switch 21 is operated to effect rotation of the motor 12 in counter-clockwise direction and, accordingly, to operate the rheostat 7 to decrease the value of the rheostat 7 which is included in the circuit of the rotor winding 6. Thus, the speed of the induction motor is increased and, if no anti-hunting means were provided, the resistance in the rotor circuit would be continually reduced until normal voltage would be generated by the magneto 14 to operate the magnet 19 and effect separation of the contact members 29 and 30. Consequently, by reason of the inertia of the various moving parts of the regulator and of the motor 12, it is apparent that the motor 12 would overtravel to lower the resistance of the rotor circuit below the desired value and, accordingly, to increase the speed of the motor 1 above normal value. In order to prevent such overtravel and the resulting hunting action, the interlock-switch member 38 is provided for reducing the energization of the auxiliary magnet 20 by increasing the resistance value of the resistor 45. Thus, upon operation of the switch 21, the interlock-switch member 38 opens the short-circuit which normally obtains across that portion of the resistor 45 which is included between the taps 51 and 52. Consequently, the energization of the magnet 20 is reduced to increase the pressure on the piston 26 of the main magnet 19. Such increase in pressure on the piston 26 changes the setting of the main magnet 19 to effect separation of the contact members 29 and 30 just prior to the obtaining of normal speed by the induction motor 1.

Assuming the induction motor 1 to be operating above normal speed, the voltage of the generator 14 is raised to increase the energization of the main magnet 19. The main magnet 19 operates the contact arm 25 to effect engagement between the contact members 29 and 31 and, accordingly, to operate the switch 22. The switch 22 operates the motor 12 in a clockwise direction to increase the resistance value of the rheostat 7 which is included in the rotor winding 6 to decrease the induction-motor speed.

Upon operation of the switch 22, the interlock-switch member 43 short-circuits that portion of the resistor 45 which is included between the taps 52 and 53 to increase the energization of the auxiliary magnet 20 and, accordingly, to change the setting of the main magnet 19 to prevent hunting action. Upon increasing the energization of the auxiliary magnet 20, the core armature 46 is raised to reduce the pressure acting on the piston 26 of the main magnet 19 and, accordingly, permit the separation of the contact members 29 and 31 just prior to the obtaining of normal speed by the induction motor 1.

The regulator system shown in Fig. 2 of the drawing operates similarly to the regulator system shown in Fig. 1 and, accordingly, like parts have been indicated by corresponding reference numerals.

In the system disclosed in Fig. 2. the rheostat 7, which controls the resistance included in the circuit of the rotor winding 6, is operated by an auxiliary motor 60 having an armature 61 and differential field windings 62 and 63. The armature shaft 64 of the motor 60 is connected, by means of a worm gearing 66, to a shaft 65 which supports the arms 11 of the rheostat 7. The shaft 65 also carries a pinion 67 which acts on a rack 68 for raising and lowering a piston 69 in a cylinder 70 in accordance with the operation of the motor 60. The cylinder 70 is connected to the cylinder 27 of the main control magnet 19 by a pipe 71, containing any suitable fluid, in the same manner as the cylinder 49 of the auxiliary magnet 20 is connected to the cylinder 27 of the main magnet 19 in the system disclosed in Fig. 1 of the drawing.

Upon engagement between the contact arms 29 and 30, the field winding 63 is connected in series with the armature 61 across the auxiliary supply circuit comprising conductors 33 and 34 in order to effect clockwise rotation of the motor 60 to increase the speed of the induction motor 1. Upon engagement between the contact members 29 and 31, the field winding 62 is connected in series with the armature 61 across the supply conductors 33 and 34 to effect counter-clockwise rotation of the motor 60 for decreasing the speed of the induction motor 1.

Upon operation of a main control magnet 19 to rotate the motor 16 in a clockwise or in a counter-clockwise direction, to increase or to decrease the speed of the induction motor 1, the setting of the main magnet 19 is changed by the operation of the piston 69 in the cylinder 70 to effect separation of the contact members 29 and 30 or the contact members 29 and 31 just prior to the obtaining of normal speed by the induction motor.

Although I have illustrated and described my invention as applied to induction motors, it is apparent that the regulator system is equally well applicable for governing the speed of a shunt-wound motor by varying the resistors included in the circuit of shunt field windings. Moreover, such a system and anti-hunting device may be applied to many other moving bodies.

Modifications in the system and arrangement and location of parts may be made within the spirit and scope of my invention, and such modifications are intended to be covered by the appended claims.

I claim as my invention:

1. In a speed-regulator system, the combination with an induction motor having a stator and a rotor winding, a dynamo-electric machine operated in accordance with the speed of said motor, and a main magnet operated by said machine, of an auxiliary magnet having a mechanical connection to said main magnet, and means controlled by said main magnet for varying the resistance of said rotor winding to maintain the speed of the motor substantially constant and for controlling the auxiliary magnet to react on the main magnet and prevent hunting action.

2. In a speed-regulator system, the combination with an induction motor having a stator and a rotor winding, and a main magnet operated in accordance with the speed of the motor, of an auxiliary magnet having a flexible fluid connection to the main magnet and means controlled by the main magnet for governing the speed of the motor and for operating the auxiliary magnet to react on the main magnet and prevent hunting action.

3. In a speed-regulator system, the combination comprising a motor, a main magnet operated in accordance with the speed of the motor, an auxiliary magnet, means controlled by the main magnet for maintaining the speed of the motor constant and for governing the operation of the auxiliary magnet, and a flexible fluid connection between said magnets for operating the main magnet in accordance with the operation of the auxiliary magnet to prevent hunting action.

4. In a speed-regulator system, the combination comprising an induction motor, a main control element having a main and an auxiliary magnet, means controlled by the main magnet for maintaining the speed of the motor constant and for operating the auxiliary magnet, and a flexible fluid connection between the main and the auxiliary magnet for governing the main magnet in accordance with the operation of the auxiliary magnet to prevent hunting action.

5. In a speed-regulator system, the combination comprising an induction motor having a rotor and a stator winding, a main control element having a main and an auxiliary magnet and a flexible fluid connection between the magnets, means controlled by the main magnet for varying the resistance of the rotor circuit to maintain the speed of the motor constant and for operating the auxiliary magnet to prevent hunting action by the regulator.

6. In a speed-regulator system, the combination comprising an induction motor, a main control element having a main and an auxiliary magnet, and means controlled by the main magnet for maintaining the speed of the motor substantially constant and for operating the auxiliary magnet to react on the main magnet and prevent hunting action.

7. In a speed-regulator system, the combination with an induction motor having a stator and a rotor winding, and a rheostat in the circuit of said rotor winding, of a main magnet operated in accordance with the speed of said motor, an auxiliary magnet, means controlled by said main magnet for operating said rheostat to maintain the speed of the motor constant and for controlling said auxiliary magnet, and a flexible fluid connection between said magnets for changing the setting of the main magnet in accordance with the operation of the auxiliary magnet to prevent hunting action.

8. In a speed-regulator system, the combination with an induction motor having a rotor and a stator winding, a rheostat included in the circuit of said rotor winding, and an auxiliary motor for operating said rheostat to control the speed of the induction motor, of a generator operated in accordance with the speed of the induction motor, a main magnet controlled by said generator, two switches selectively operated by the main magnet for controlling the auxiliary motor to maintain constant induction-motor speed, an auxiliary magnet controlled by said switches, and a flexible fluid connection between the main and the auxiliary magnet for changing the setting of the main magnet in accordance with the operation of the auxiliary magnet to prevent hunting action.

In testimony whereof, I have hereunto subscribed my name this 12th day of Aug., 1919.

CLARENCE A. BODDIE.